Dec. 22, 1925.

A. W. JACOBSON ET AL 1,566,875

SLED

Filed Oct. 13, 1924

WITNESS:
L. Thompson.

INVENTORS
A. W. Jacobson
BY W. T. Shastal
H. J. Sanders
ATTORNEY

Patented Dec. 22, 1925.

1,566,875

UNITED STATES PATENT OFFICE.

ANDERS WALFRID JACOBSON AND WILLIAM GEORGE SHASTAL, OF HURKETT, ONTARIO, CANADA.

SLED.

Application filed October 13, 1924. Serial No. 743,502.

*To all whom it may concern:*

Be it known that we, ANDERS W. JACOBSON and WILLIAM G. SHASTAL, citizens, respectively, of Sweden and Austria, and residents of Hurkett, Ontario, Canada, have jointly invented certain new and useful Improvements in Sleds, of which the following is a specification.

This invention relates to improvements in sleds provided with novel propelling means whereby they are enabled to travel over ice and snow with facility. Simplicity in construction and efficiency are objects attained.

With the above and other objects in view the invention consists in the combination and arrangement of parts to be hereinafter fully described, pointed out in the appended claims and illustrated in the accompanying drawing which forms a part of this application and in which—

Like reference characters denote corresponding parts throughout the several views.

Figure 1:
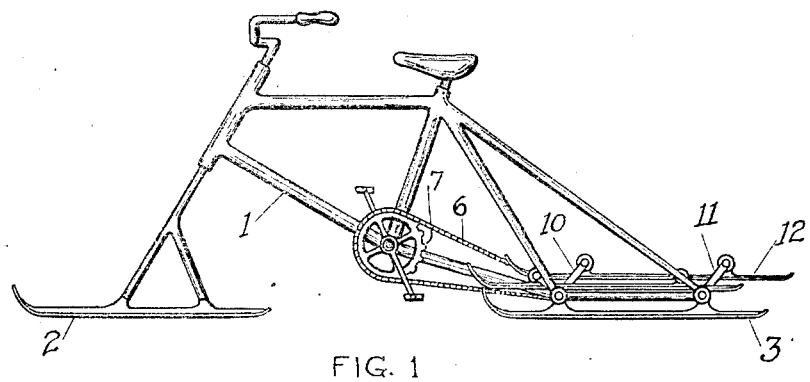
Fig. 1 is a view of the sled in side elevation.
Figure 3:
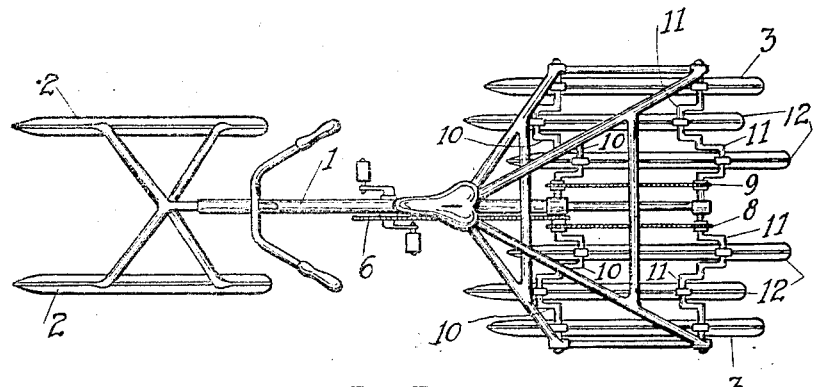
Fig. 3 is a fragmentary perspective view.
Figure 2:
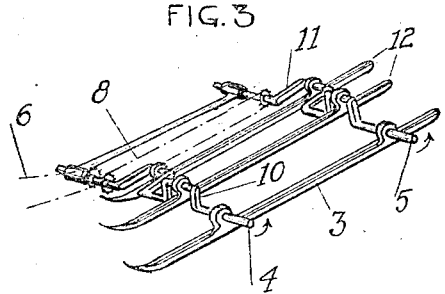
Fig. 2 is a plan view of the same.

The sled comprises the frame 1 supported upon the front steering runners 2 and upon the rear runners 3 arranged upon the transverse crank shafts 4, 5 secured in the frame 1. The shaft 4 is driven by a small gear thereupon in mesh with the chain 6 that is driven by the sprocket wheel 7, said shaft 4 being connected by the chains 8, 9 to the shaft 5, each of said shafts being provided with small gears engaged by said chains so that the shaft 4 drives the shaft 5.

The crank shaft 4 is provided with four cranks 10, two upon each side of the frame 1, and the crank shaft 5 with four cranks 11, two upon each side of the frame and to said cranks the propelling steppers 12 are secured. As the cranks 4, 5 rotate the throw causes the successive steppers to alternately move forward and back, contacting with the road as they move backward and thus propelling the vehicle forward. The steppers are so pitched or hung that they will frictionally engage the road upon their backward movement and so provide sufficient traction to propel the vehicle without material jar or jolt, the runners 3 remaining in constant engagement with the road. The runners 3 are arranged upon the driving shafts, the same shafts that carry the steppers, the successive cranks of each shaft being preferably disposed at right angles to each other but the arrangement being such that slightly changing the angle of any of the cranks will adjust the steppers relatively and also adjust them relative to the runners 3.

What is claimed is:—

1. In a sled, a frame, steering runners therefor, a pair of spaced crank shafts carried by said frame, supporting runners at the ends of said crank shafts, and steppers carried by the cranks of said crank shafts.

2. In a sled, a frame, steering runners therefor, a pair of spaced crank shafts carried by said frame, the successive cranks of each shaft being disposed at right angles to each other, supporting runners at the ends of said crank shafts, and steppers carried by the cranks of said crank shafts.

In testimony that we claim the foregoing as our own we have hereto affixed our signatures.

ANDERS WALFRID JACOBSON.
WILLIAM GEORGE SHASTAL.